United States Patent
Fichtner-Pflaum et al.

(10) Patent No.: US 9,903,430 B2
(45) Date of Patent: Feb. 27, 2018

(54) BRAKE SYSTEM AND ELECTRIC MOTOR

(71) Applicant: SEW-EURODRIVE GMBH & CO. KG, Bruchsal (DE)

(72) Inventors: Gerolf Fichtner-Pflaum, Kraichtal-Unteröwisheim (DE); Gerhard Flörchinger, Harthausen (DE); Barbara Huck, Bruchsal (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 0 days.

(21) Appl. No.: 14/647,724

(22) PCT Filed: Nov. 25, 2013

(86) PCT No.: PCT/EP2013/003550
§ 371 (c)(1),
(2) Date: May 27, 2015

(87) PCT Pub. No.: WO2014/082725
PCT Pub. Date: Jun. 5, 2014

(65) Prior Publication Data
US 2015/0292580 A1    Oct. 15, 2015

(30) Foreign Application Priority Data
Nov. 28, 2012 (DE) .................. 10 2012 023 167

(51) Int. Cl.
*F16D 65/18* (2006.01)
*F16D 55/36* (2006.01)
(Continued)

(52) U.S. Cl.
CPC ............ *F16D 65/18* (2013.01); *F16D 55/36* (2013.01); *F16D 2055/0058* (2013.01);
(Continued)

(58) Field of Classification Search
CPC .............. F16D 59/02; F16D 2121/005; F16D 2121/16; F16D 2121/22; F16D 2125/64;
(Continued)

(56) References Cited

U.S. PATENT DOCUMENTS 2,467,891 A * 4/1949 Hollander ............... B60T 13/74
                                                           188/171
2,620,901 A * 12/1952 Stearns .................... F16D 55/36
                                                           116/208
(Continued)

FOREIGN PATENT DOCUMENTS

| DE | 29512403 U1 * | 10/1995 | ............. F16D 55/28 |
| DE | 196 22 983 | 11/1997 | |

(Continued)

OTHER PUBLICATIONS

Machine translation of DE 29512403 (no date).*
(Continued)

*Primary Examiner* — Nicholas J Lane
(74) *Attorney, Agent, or Firm* — Andrews Kurth Kenyon LLP (57) ABSTRACT

An electromagnetically actuatable brake system is provided, particularly for an electric motor having a rotor shaft, and an electric motor, the brake system having an armature disk, wherein the brake system has a brake lever, especially for the manual release of a brake,
the brake lever having a first lever section and a second lever section, in particular, being made up of a first lever section and a second lever section.

34 Claims, 5 Drawing Sheets

(51) Int. Cl.
*F16D 55/00* (2006.01)
*F16D 121/16* (2012.01)
*F16D 121/22* (2012.01)
*F16D 125/28* (2012.01)
*F16D 125/64* (2012.01)

(52) U.S. Cl.
CPC ...... *F16D 2121/16* (2013.01); *F16D 2121/22* (2013.01); *F16D 2125/28* (2013.01); *F16D 2125/64* (2013.01)

(58) Field of Classification Search
CPC ........... F16D 2125/645; F16D 2125/68; F16D 2127/02; F16D 2127/04; F16D 2500/3146
See application file for complete search history.

(56) References Cited

U.S. PATENT DOCUMENTS

| | | | |
|---|---|---|---|
| 4,154,321 A * | 5/1979 | Falk | B60T 1/065 188/71.9 |
| 6,179,090 B1 | 1/2001 | Casas | |
| 6,321,882 B1 * | 11/2001 | Heckel | F04C 2/104 188/72.6 |
| 6,374,953 B1 | 4/2002 | Casas | |
| 6,536,563 B1 * | 3/2003 | Schlehbusch | F16D 55/28 188/161 |
| 2009/0166136 A1 * | 7/2009 | Eberle | F16D 55/30 188/171 |
| 2010/0000823 A1 * | 1/2010 | Sheynkman | B66B 19/02 187/251 |

FOREIGN PATENT DOCUMENTS

| | | | |
|---|---|---|---|
| DE | 199 02 195 | 8/2000 | |
| DE | 10 2010 049 744 | 5/2012 | |
| DE | 102011011231 A1 * | 8/2012 | ............ F16D 65/28 |
| DE | 10 2011 016 892 | 10/2012 | |

OTHER PUBLICATIONS

Machine translation of DE 102011011231 (no date).*
Machine translation of DE 19902195 (no date).*
International Search Report, dated Mar. 13, 2014, issued in corresponding International Application No. PCT/EP2013/003550.
International Preliminary Report on Patentability, dated Jun. 11, 2015, issued in corresponding International Application No. PCT/EP2013/003550.

* cited by examiner

BRAKE SYSTEM AND ELECTRIC MOTOR

FIELD OF THE INVENTION

The present invention relates to a brake system and an electric motor.

BACKGROUND INFORMATION

German Patent No. 196 22 983 C1 describes an electromagnetically actuated brake for a motor.

SUMMARY

Therefore, an object of the present invention is to further develop a brake system, with the intention of improving the safety.

Important features of the invention with regard to the brake system, particularly for an electric motor having a rotor shaft, where the brake system has an armature disk, are that the brake system has a brake lever, especially for the manual release of a brake, the brake lever having a first and a second lever section, in particular, being made up of a first and a second lever section.

The advantage in this context is that the manual release of the brake facilitates the maintenance and inspection of the brake.

The construction of the brake lever with two lever sections reduces the force having to be applied by the operator during the manual release of the brake. In addition, the length of the lever arm is reducible by the use of the double lever. Thus, the brake lever is able to be made compact.

In one advantageous development, the first lever section and the second lever section are disposed in a manner allowing rotation relative to each other, in particular, the first lever section being rotationally mounted on the second lever section. This has the advantage that the brake lever is able to be compact.

In one advantageous refinement, a pivot bearing, especially including a pin, is positioned between the first lever section and the second lever section. This is advantageous because the mounting of the two lever sections is low-wear. The pivot bearing permits rotation about a single axis of rotation, which means the pivot bearing is particularly long-lived and may be exposed to great forces.

In one advantageous embodiment, the first lever section and the second lever section are supported on the pin by friction bearings. The advantage here is that a support by friction bearings is feasible in easy manner and exhibits low susceptibility to breakdown. Safety is thus improved.

In one advantageous development, a roller is rotationally mounted on the second lever section. This has the advantage that the brake lever may be compact. The flow of power is able to be diverted from the first to the second lever section with the aid of the roller, which means the space needed for the brake lever is small. The roller seating according to the present invention is easily practicable in robust and long-lived fashion. Consequently, safety is improved.

In one advantageous refinement, the brake, especially a magnet body of the brake, has a surface section, particularly an axial lateral surface, which is suitable as rolling surface for the roller, the roller contacting an area of the rolling surface. The advantage is thereby that the rolling surface limits the movement of the roller in the axial direction. The roller rolls on the rolling surface, and thus defines the position of the brake lever.

In one advantageous embodiment, the first lever section contacts the surface of the brake, particularly the axial lateral surface of the brake, especially of the magnet body of the brake, so that a support is formed for the first lever section on the brake. The advantage in this instance is that the support acts as rotation point for the brake lever. The brake system may thereby be made compact.

In one advantageous development, as support, a protrusion formed on the magnet body engages with a corresponding depression in the first lever section. This is advantageous because the support is able to be produced in an easy manner. At the same time, the support may be made compact and stable.

In one advantageous embodiment, the support is realized in one piece with the magnet body. This has the advantage that the support may be produced inexpensively. The support realized in one piece with the magnet body is advantageously more stable than a separate support which has a predetermined breaking point at its joining surface to the magnet body.

In one advantageous development, the rolling surface is limited by at least one limiting means, especially for limiting the radial movement of the roller. This offers the advantage that the roller is movable only in a limited area. Thus, a malfunction of the brake lever is preventable and reliability of the brake lever is improved.

In one advantageous refinement, the limiting means are formed in one piece on the magnet body. This has the advantage that the limiting means may be produced inexpensively and in compact fashion.

In one advantageous embodiment, at least one bolt is connected, especially by a threaded connection, to an armature disk, the bolt limiting the distance of the armature disk to the magnet body with the aid of a limiting element, and being connected, particularly by a threaded connection, to the limiting element, the bolt being passed through a continuous, especially axial first bore in the first lever section. This offers the advantage that the armature disk is displaceable by the brake lever. During maintenance of the brake, a manual displacement of the armature disk is advantageous in order to check the functionality of the brake. Consequently, the braking force of the brake is able to be checked; should the braking force decrease, the brake is able to be re-adjusted, and therefore the safety of the brake is improved.

In one advantageous development, the limiting element is situated on the side of the first lever section facing away from the armature disk. The advantage in this instance is that the limiting element couples the armature disk to the first lever section depending on the position of the brake lever. In the closed position of the brake lever, the limiting element is set apart from the first lever section, so that the armature disk is movable in the axial direction in a manner unrestricted by the limiting element. In the open position of the brake lever, the first lever section is pressed against the limiting element, and thereby presses the armature disk against the magnet body, so that the brake is released.

In one advantageous development, the limiting element has a larger outside diameter than the first bore. This offers the advantage that the first bore limits the limiting element in the axial direction. Thus, the distance of the armature disk to the magnet body may be limited in an easy manner.

In one advantageous refinement, the bolt is passed through a continuous, especially axial through-bore in the magnet body. This has the advantage that the brake may be compact. In this instance, the bolt is guided by the through-bore in the magnet body.

In one advantageous embodiment, the magnet body is disposed between the armature disk and the first lever section. The advantage in so doing is that the magnet body limits the movement of the armature disk in the axial direction. At the same time, the armature disk is able to be pressed against the magnet body with the aid of the first lever section.

In one advantageous refinement, at least one further bolt is connected, particularly by a threaded connection, to the magnet body, the bolt being passed through a continuous, especially axial second bore in the first lever section, the bolt limiting the distance of the first lever section to the magnet body with the aid of a limiting element and a spring element situated between the limiting element and the first lever section. The advantage here is that a restoring force, directed axially in the direction of the magnet body, acts on the first lever section. This restoring force results in a small distance between the magnet body and the first lever section. At the same time, the second lever section, which is joined to the first lever section, is also pressed against the magnet body. Consequently, the restoring force acting on the first lever section is independent of the spring force acting on the armature disk, so that this spring force is able to be adjusted precisely, thereby improving the safety of the brake.

In one advantageous development, the first lever section is situated between the magnet body and the spring element. This is advantageous because the spring force of the spring element acts on the first lever section. In particular, this spring force is adjustable with the aid of the limiting element, whose axial position on the bolt is adjustable. The spring force advantageously pushes the brake lever into a neutral position, in which the armature disk is movable independently of the brake lever.

In one advantageous development, the limiting element has a larger outside diameter than the spring element. The advantage in this case is that the spring element is limited in the axial direction and is supported on the limiting element. Thus, the distance of the first lever section to the magnet body may be limited in an easy manner. This limitation may be realized elastically, so that the brake lever is displaceable manually relative to the spring force.

In one advantageous development, the spring element has a larger outside diameter than the second bore. The advantage in this case is that the spring element is limited in the axial direction and is supported on the magnet body.

Thus, the distance of the first lever section to the magnet body may be limited in an easy manner.

In one advantageous embodiment, the brake system has
a coil, which is accommodated in the magnet body,
a brake-pad carrier which is disposed so as to be rotatably fixed with the aid of a driver toothing situated on a shaft, especially on the rotor shaft of the electric motor, with form locking particularly in the circumferential direction, and movable axially, especially in the axial direction of the rotor, and to that end, in particular, the brake-pad carrier having a corresponding internal toothing engaged with the driver toothing,
and the armature disk joined in rotatably fixed manner to the magnet body, but disposed in a manner allowing axial movement, the armature disk being guided by at least one guide part in the axial direction of the rotor shaft.

The advantage in this context is that the electromagnetic, formed by the coil and the magnet body, attracts the armature disk, so that the armature disk is set apart axially from the brake-pad carrier. As a result, the brake-pad carrier, joined in rotatably fixed manner to the rotor shaft, co-rotates with the rotor shaft. When the electromagnet is energized, the brake is thus released and the rotor shaft of the electric motor rotates unbraked. Upon engagement of the brake, the armature disk presses on the brake-pad carrier and brakes it, whereby the rotor shaft joined by the driver toothing to the brake-pad carrier is also braked.

In one advantageous development, the armature disk is acted upon by at least one spring part, in particular, the spring part being supported on the magnet body. This is advantageous because the spring part presses the armature disk against the brake-pad carrier, so that upon cut-off or loss of the current through the coil, the brake engages and the electric motor is decelerated. Thus, in the event of a power loss, engagement of the brake is ensured, so that the motor does not rotate unchecked. Operational safety is thus improved.

In one advantageous embodiment, the guide part(s) is/are secured to the magnet body. This is advantageous because the armature disk is disposed in rotatably fixed manner on the magnet body. Consequently, co-rotation of the armature disk with the brake-pad carrier is able to be prevented, and safety of the brake is improved.

In one advantageous development, the brake-pad carrier is situated axially between the armature disk and a part having a braking surface. The advantage in this case is that upon engagement of the brake, the armature disk presses the brake-pad carrier onto the braking surface. The brake-pad carrier is thus doubly braked here, once on the armature disk and once on the braking surface. Safety of the brake is thus improved.

In one advantageous refinement, the brake system has a further armature disk, at least one further bolt being connected, especially by a threaded connection, to the further armature disk and limiting the distance of the further armature disk to a further magnet body with the aid of a further limiting element, and being connected, especially by a threaded connection, to the further limiting element, the further bolt being passed through a continuous, especially axial third bore in the first lever section. This is advantageous because the additional armature disk permits greater braking force than a single armature disk. The further armature disk is able to be released manually simultaneously with the armature disk with the aid of the brake lever.

In one advantageous development, the further limiting element is situated on the side of the first lever section facing away from the armature disk. The advantage in this instance is that the limiting element couples the further armature disk to the first lever section depending on the position of the brake lever. In the closed position of the brake lever, the limiting element is set apart from the first lever section, so that the further armature disk is movable in the axial direction in a manner unrestricted by the limiting element. In the open position of the brake lever, the first lever section is pressed against the limiting element, and thereby presses the further armature disk against the magnet body, so that the brake is released.

In one advantageous development, the further limiting element has a larger outside diameter than the third bore. The advantage in this instance is that the limiting element is limited in the axial direction by the first lever section. Thus, the distance of the further armature disk to the further magnet body may be limited in an easy manner.

In one advantageous refinement, the bolt is passed through a continuous, especially axial further through-bore in the magnet body. This has the advantage that the brake may be compact. The bolt is thereby guided with the aid of the further through-bore in the magnet body.

In one advantageous embodiment, the further magnet body is situated between the further armature disk and the brake-pad carrier. This offers the advantage that the further magnet body is usable as a part having a braking surface. Thus, the number of component parts is reducible and the brake is able to be produced inexpensively.

In one advantageous refinement, the further bolt is passed through a continuous, especially axial bore in the further magnet body. This is advantageous because the further magnet body is usable for guiding the further bolt joined to the further armature disk.

In one advantageous development, the further bolt is passed through an uninterrupted, especially axial bore in the armature disk. The advantage in this case is that the brake is able to be made compact, and the further bolt is usable for guiding the armature disk.

In one advantageous refinement, an outer maximum radius of the brake-pad carrier is smaller than the radial distance between the further bolt and the axis of rotation. The advantage here is that the brake-pad carrier is set apart from the further bolt. In the case of one realization of the brake having a plurality of bolts distributed uniformly in the circumferential direction, the brake-pad carrier thus rotates radially within the bolts. The brake is therefore able to be made compact.

In one advantageous embodiment, the brake system has
- a further coil, which is accommodated in a further magnet body,
- a further brake-pad carrier which is disposed so as to be rotatably fixed with the aid of a further driver toothing located on a shaft, especially on the rotor shaft of the electric motor, with form locking particularly in the circumferential direction, and movable axially, especially in the axial direction of the rotor,
- and the further armature disk joined in rotatably fixed manner to the further magnet body but disposed in a manner allowing axial movement, especially the further armature disk guided by at least one further guide part in the axial direction of the rotor shaft.

The advantage in this instance is that the electromagnetic, formed by the further coil and the further magnet body, attracts the further armature disk, so that the further armature disk is set apart axially from the further brake-pad carrier. As a result, the further brake-pad carrier, joined in rotatably fixed manner to the rotor shaft, co-rotates with the rotor shaft. When the electromagnet is energized, the brake is thus released and the rotor shaft of the electric motor rotates unbraked. Upon engagement of the brake, the further armature disk presses on the further brake-pad carrier and brakes it, whereby the rotor shaft joined by the further driver toothing to the further brake-pad carrier is also braked. The brake may thus be realized with two brake units. The braking force is therefore able to be increased. In addition, if the brake is realized in redundant fashion, should one brake unit fail, an emergency braking is possible with the other brake unit.

In one advantageous refinement, the part having the braking surface is the further magnet body. The advantage in this case is that it is possible to save on component parts, and thus the brake may be realized compactly and inexpensively. Environmental protection is thereby improved.

In one advantageous development, the further armature disk is acted upon by at least one further spring part, in particular, the further spring part being supported on the further magnet body. This is advantageous because the further spring part presses the further armature disk against the further brake-pad carrier, so that upon cut-off of the current through the further coil, the brake engages and the electric motor is decelerated.

In one advantageous embodiment, the further guide part(s) is/are secured to the further magnet body. This is advantageous because the further armature disk is disposed in rotatably fixed manner on the further magnet body. Consequently, co-rotation of the further armature disk with the further brake-pad carrier is able to be prevented, and safety of the brake is improved.

In one advantageous development, the further brake-pad carrier is situated axially between a further armature disk and a further part having a braking surface. This offers the advantage that upon engagement of the brake, the further armature disk presses the further brake-pad carrier onto the further part having a braking surface. The further brake-pad carrier is thus doubly braked here, once on the further armature disk, and once on the further part having a braking surface. Reliability of the brake is thus improved.

In one advantageous development, the further part having a braking surface is implemented as a housing part or an end shield. This is advantageous because the number of component parts is reducible, and the brake may thus be realized compactly and inexpensively.

In one advantageous refinement, the first lever section has two supports. The advantage here is that the force acting on the supports is distributed over two supports. The force acting on one support, and thus the stress for the material, is thereby reduced. The wear on the brake lever is therefore reducible, and safety is improved.

In one advantageous embodiment, the first lever section has one connecting section and two limb sections. This offers the advantage that the shaft is able to be passed radially between the two limb sections, so that on the side of the brake lever facing away from the brake, a ventilator or a sensor is able to be connected to the shaft.

In one advantageous refinement, the rolling surface is located in the circumferential direction between two supports. The advantage in this case is that the longest possible lever arm is able to be used for the brake lever, thus improving the lever action of the brake lever.

In one advantageous development, the supports are disposed at the same axial position. This offers the advantage that the lever force acting on the supports is distributable uniformly over both supports, so that the brake lever is displaceable uniformly. The wear on the brake system is thereby reducible, and thus safety is improved.

In one advantageous refinement, the rolling surface is even and/or flat, in particular, the direction of surface normal of the rolling surface being parallel to the axis of rotation. This is advantageous because the roller rolls well on the rolling surface and suffers little wear, so that the reliability of the brake lever is improved.

In one advantageous development, each limb section of the first lever section has at least a first bore and a second and/or third bore. The advantage in this context is that the lever force is distributable uniformly over both limbs of the first lever section, so that the brake lever is displaceable uniformly. The wear on the brake system is thereby reducible, thus improving the safety.

In one advantageous development, in a first lever position, a surface section, especially of the bottom side, of the limiting element touches a contact surface of the first lever section, so that the contact surface and the surface section are aligned in parallel, and in a second lever position, the surface section is set apart from the contact surface and is rotated by a non-zero angular value relative to the contact surface, in particular, the normal of the surface section having a non-zero angle relative to the normal of the contact surface. The advantage in this case is that in the second lever position, the limiting element is set apart from the brake lever, so that the armature disk, which is joined to the bolt that is joined to the limiting element, is movable in the axial direction. In the first lever position, the limiting element contacts the first lever section in planar fashion. A planar contact is advantageous for the transmission of force, since the force is distributed uniformly on the surface, so that the pressure on the first lever section, and thus the material load, is reduced. The angle between the normal of the contact surface and the normal of the surface section prevents deformation of the bolt upon displacement of the brake lever.

In one advantageous refinement, the angle between the normal of the surface section and the normal of the contact surface is between 5° and 45°, in particular, is equal to the maximum displacement angle of the brake lever. This is advantageous because the angle corresponds essentially to the displacement angle of the brake lever, thus, when the brake lever is in the displaced state, the normals are essentially parallel, and deformation of the bolt upon actuation of the brake lever is preventable.

In one advantageous embodiment, the brake system is released in the first lever position. The advantage in this case is that the armature disk is pressed against the magnet body with the aid of the brake lever, thus, the pad carrier is able to co-rotate with the rotor shaft in unhindered fashion.

In one advantageous refinement, the contact surface is realized as a notch in a surface of the first lever section. This is advantageous because the notch is able to be produced in an easy manner.

In one advantageous development, the brake lever is disposed on the side of the brake facing away axially from the electric motor. The advantage in so doing is that the brake lever is able to be integrated into an at least partially closed brake housing, especially motor housing. Consequently, the brake is able to be protected from penetrating dirt particles, and operational reliability of the brake is improved.

In one advantageous development, the brake lever has an operating element. This offers the advantage that the lever arm is able to be lengthened with the aid of the operating element. The expenditure of force upon displacement of the brake lever is thus reducible.

In one advantageous refinement, the operating element is joined, especially releasably joined, to the second lever section. The advantage in this case is that the first and second lever sections do not project beyond the brake housing in the radial direction. An unintentional operation of the brake lever is therefore avoidable, thus improving brake safety.

In one advantageous refinement, the second lever section has a threaded bore, into which the operating element is able to be screwed into place. This is advantageous because the operating element is able to be joined easily to the second lever section.

In one advantageous development, a fastening means is able to be screwed into the brake lever, particularly for joining the brake lever to the brake. This offers the advantage that the displaced brake lever is able to be fixed in position on the brake contrary to the restoring force applied by the spring elements, so that maintenance work may be carried out without the need to displace the brake lever manually.

Important features of the present invention with regard to the electric motor, having a brake system and a rotor shaft, are that a brake-pad carrier is joined in rotatably fixed but axially displaceable manner to the rotor shaft.

The advantage in this context is that safety of the electric motor is improved. The brake system allows improved maintenance of the electric motor. In the event of a defect at the electromagnet, the brake may easily be released manually with little expenditure of force.

In one advantageous embodiment, the rotor shaft has two driver toothings set apart axially from each other. This is advantageous because two pad carriers are usable in the electric motor, thereby increasing the braking force and therefore improving the safety of the electric motor.

DETAILED DESCRIPTION

Figure 1:
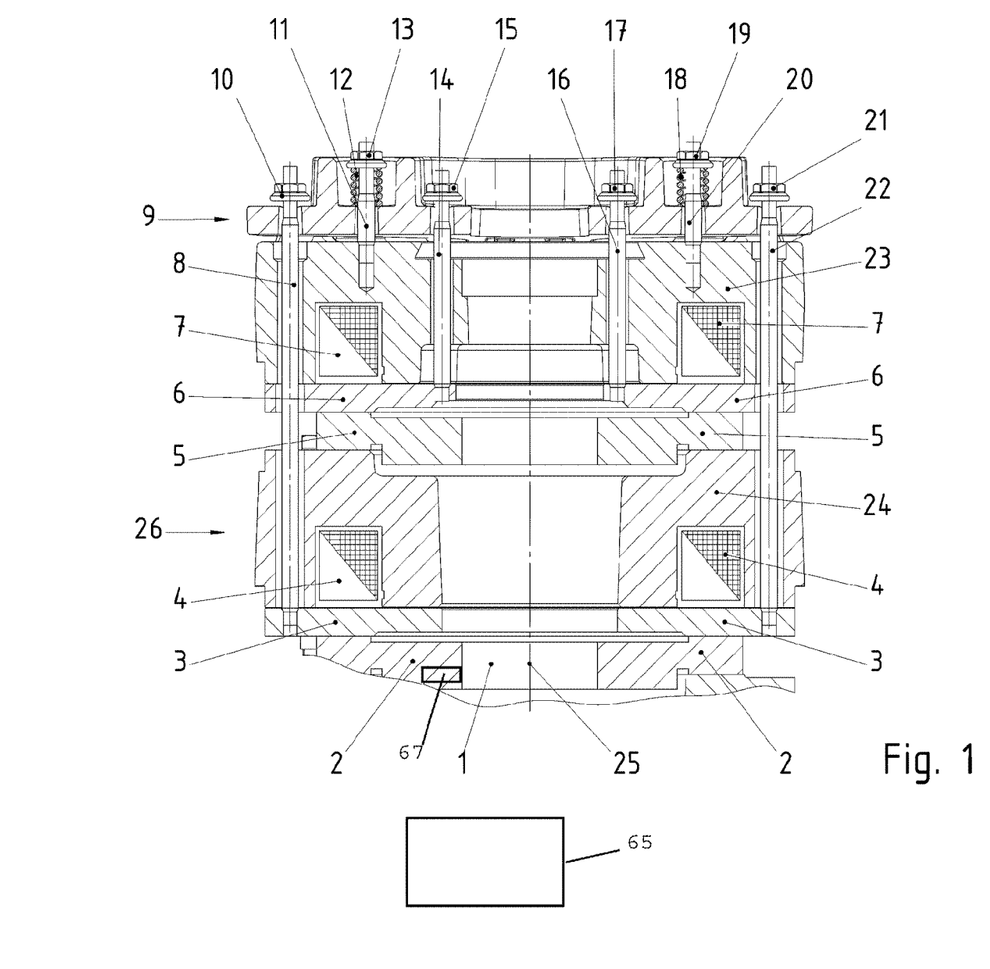
FIG. 1 shows a brake system according to the present invention in a sectional view.

Brake 26 of the present invention shown in FIG. 1 has two armature disks 3, 6. One armature disk 6 is disposed between a magnet body 23 and a pad carrier 5 in a manner allowing axial movement. Magnet body 23 has a ring-shaped coil 7.

The axial direction is defined here by an axis of rotation 25 of brake 26, particularly by an axis of shaft 1 to be decelerated by brake 26, especially a rotor-shaft axis of the electric motor.

A further armature disk 3 is disposed between a further magnet body 24 and a further pad carrier 2 in a manner allowing axial movement. Further magnet body 24 has a further ring-shaped coil 4.

Armature disks 3, 6 are rotatably fixed with respect to a shaft 1 of a motor, preferably an electric motor 65. To that end, guide bolts 51, 52 are disposed in the brake, which extend in the axial direction. Guide bolts 51, 52 are passed through bores (not shown) in armature disks 3, 6.

Rods are also included under the term bolts in this document. Alternatively, instead of bolts, screws may be used, with the screw head acting as limiting element. In each case, pad carriers 2, 5 have a brake pad on their axial lateral surfaces, thus, are brake-pad carriers. Pad carriers 2, 5 are disposed in rotatably fixed but axially displaceable manner on shaft 1. In this context, the torque is transmitted with the aid of a driver toothing 67, pad carriers 2, 5 having an internal toothing, and a driver (not shown) having an external toothing insertable into the internal toothing. These two toothings mesh with each other and essentially represent a denture clutch.

In the axial direction, brake 26 is constructed as follows: On the motor side, brake 26 has a housing part 53, on whose side facing away from the motor, further pad carrier 2 is disposed. Further armature disk 3 is situated next to further pad carrier 2. Next to further armature disk 3 is further magnet body 24. Pad carrier 5 is situated between further magnet body 24 and armature disk 6. Magnet body 23 is disposed on the side of armature disk 6 facing away from the motor.

Housing part 53 has a braking surface, on which the brake pad of further pad carrier 2 rubs upon engagement of the brake. Housing part 53 then acts as a heat dissipater of the heat resulting during the braking.

Upon engagement of brake 26, thus, after the current through coils 4, 7 has been switched off, armature disks 3, 6 are pressed against pad carriers 2, 5 by spring force acting in the axial direction. As a result, further armature disk 3 presses further pad carrier 2 against a friction surface (not shown), so that pad carrier 2 is braked with the aid of its two brake pads. Armature disk 6 presses pad carrier 5 against a friction surface on further magnet body 24, so that pad carrier 5 is braked with the aid of its two brake pads.

The spring force acting on armature disks 3, 6 is produced with the aid of spring elements 31, 30 disposed within magnet bodies 24, 23.

Upon the release of brake 26, thus, in response to the switch-on of the current through coils 4, 7, an axial force is exerted on armature disks 3, 6. This force is magnetic and attracts armature disks 3, 6 contrary to the spring force, so that armature disks 3, 6 release from the brake pads of pad carriers 2, 5 and rest against respective magnet bodies 24, 23, Thus, pad carriers 2, 5 are freely rotatable, and shaft 1 of the motor rotates.

An operating air gap is provided axially between further armature disk 3 and further magnet body 24. An operating air gap is likewise provided axially between armature disk 6 and magnet body 23. An operating air gap is provided axially between pad carrier 5 and further magnet body 24, and an operating air gap is provided axially between further pad carrier 2 and housing part 53.

Armature disks 3, 6 and magnet bodies 24, 23, as well as housing part 53 each have a radially centered opening, through which shaft 1 is passed. In so doing, shaft 1 is set apart from the walls of the openings in armature disks 3, 6 and magnet bodies 24, 23, as well as in housing part 53.

A brake lever 9 is disposed on the side of brake 26 facing away from the motor in the axial direction.

Brake lever 9 is joined to magnet body 23 by at least one bolt 11, 20. For that purpose, magnet body 23 has at least one threaded blind-end bore, into which bolt 11, 20 in the form of a threaded bolt is screwed. Brake lever 9 has at least one axial bore, through which the at least one bolt 11, 20, is passed. Facing away from brake lever 9 in the axial direction, a spring element 12, 18 is disposed on bolt 11, 20. This spring element 12, 18 is situated axially between brake lever 9 and at least one limiting element 13, 19. In this instance, the outside diameter of spring element 12, 18 is greater than the outside diameter of the bore through which bolt 11, 20 is passed. In addition, the outside diameter of limiting element 13, 19 is greater than the outside diameter of spring element 12, 18.

Further armature disk 3 is joined to at least one further bolt 8, 22. Preferably two further bolts 8, 22 are provided, which extend in the axial direction and are set apart from each other in the circumferential direction. In this case, the radial distance between bolts 8, 22 is greater than the outside diameter of essentially cylindrical pad carriers 2, 5. Further bolts 8, 22 are set apart further from axis of rotation 25 in the radial direction than pad carriers 2, 5.

Further bolts 8, 22 are joined in rotatably fixed manner to further armature disk 3; preferably, further bolts 8, 22 are joined by a threaded connection to armature disk 3. To that end, provided in further armature disk 3 is at least one threaded bore, into which at least one further bolt 8, 22 is screwed. Alternatively, further bolt 8, 22 is riveted to further armature disk 3.

Armature disk 6 is joined to at least one bolt 14, 16. Preferably two bolts 14, 16 are provided, which extend in the axial direction and are set apart from each other in the circumferential direction. In this context, the radial distance between bolts 14, 16 is smaller than the outside diameter of essentially cylindrical pad carriers 2, 5. Bolts 14, 16 are set apart further from axis of rotation 25 in the radial direction than pad carriers 2, 5.

Bolts 14, 16 are joined in rotatably fixed manner to armature disk 6; preferably, bolts 14, 16 are joined by a threaded connection to armature disk 6. To that end, provided in armature disk 6 is at least one threaded bore, into which at least one bolt 14, 16 is screwed. Alternatively, bolts 14, 16 are riveted to armature disk 6.

Brake lever 9 has axial bores, through which bolts 8, 22, 14, 16 are passed. An axial end area of each bolt 8, 22, 14, 16 has a thread, with which a limiting element 10, 21, 15, 17, that preferably includes a nut, is bolted. In this case, the outside diameter of each limiting element 10, 21, 15, 17 is greater than the respective axial bore in brake lever 9.

Further bolts 8, 22 are passed through further magnet body 24, armature disk 6 and magnet body 23. For that purpose, further magnet body 24, armature disk 6 and magnet body 23 have bores which extend in the axial direction and overlap radially. Further bolts 8, 22 are thus passed through these bores and extend in the axial direction from further armature disk 3 up to brake lever 9.

Bolts 14, 16 extend in the axial direction from armature disk 6 up to brake lever 9. To that end, provided in magnet body 23 are axial bores, through which bolts 14, 16 are passed.

Spring elements 12, 18 produce a restoring force that acts in the axial direction toward the motor, on brake lever 9. This restoring force must be overcome when actuating brake lever 9. The restoring force brought about by spring elements 12, 18 is independent of the spring force of spring elements 30, 31 likewise acting in the axial direction.

Upon actuation of brake lever 9, armature disks 3, 6 are moved in the axial direction contrary to the spring force of spring elements 30, 31 toward respective magnet bodies 23, 24; in particular, armature disks 3, 6 are pressed against magnet bodies 23, 24. Thus, brake 26 is released and shaft 1, joined in rotatably fixed fashion to pad carriers 2, 5, is freely rotatable.

In this context, brake lever 9 releases armature disks 3, 6 regardless of the magnetic state of the electromagnets. Brake 26 is thus also able to be released manually in case the energizing of coils 4, 7 is interrupted. A single brake lever 9 is thus sufficient to release both armature disks 3, 6.

Figure 2:
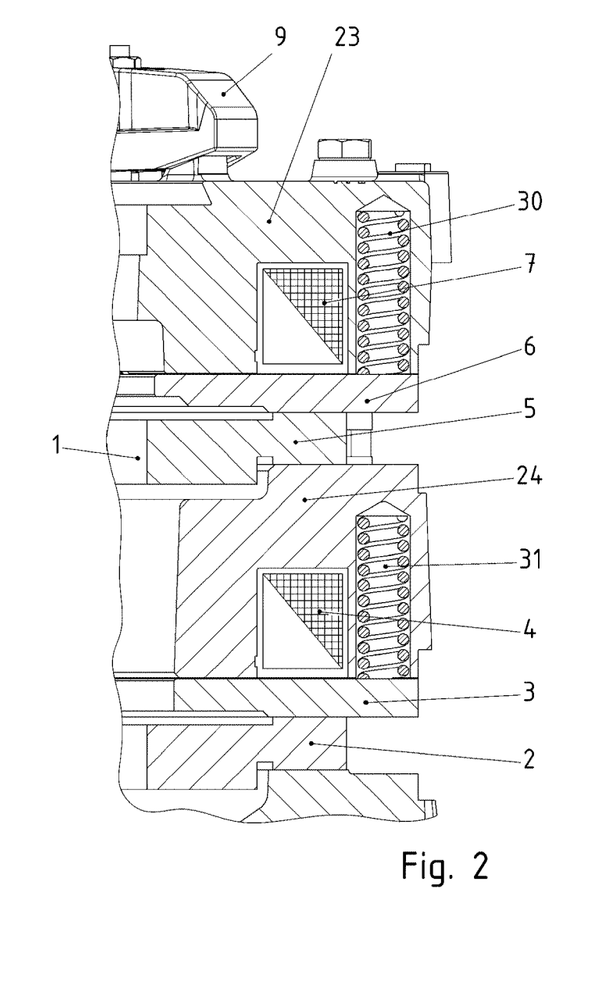
FIG. 2 shows a cut-away portion of the brake system according to the present invention in sectional view in an angle of intersection different from FIG. 1.

FIG. 2 shows a sectional view of brake 26 in a different angle of intersection than FIG. 1, so that spring elements 30, 31, which are situated in magnet bodies 23, 24, are discernible. Spring elements 30, 31 extend in the axial direction, so that their spring force acts in the axial direction on armature disks 3, 6.

Magnet body 23 has at least one axially extending opening, in which at least one spring element 30 is disposed. The opening in magnet body 23 is open toward armature disk 6. Preferably, the opening for spring element 30 is in the form of a blind-end bore. The radial distance of spring element 30 to axis of rotation 25 is greater than the radial distance of coil 7 to axis of rotation 25.

Further magnet body 24 has at least one axially extending opening, in which at least one further spring element 31 is disposed. The opening in further magnet body 24 is open toward further armature disk 3. Preferably, the opening for further spring element 31 is in the form of a blind-end bore. The radial distance of further spring element 31 to axis of rotation 25 is greater than the radial distance of further coil 4 to axis of rotation 25.

Figure 5:
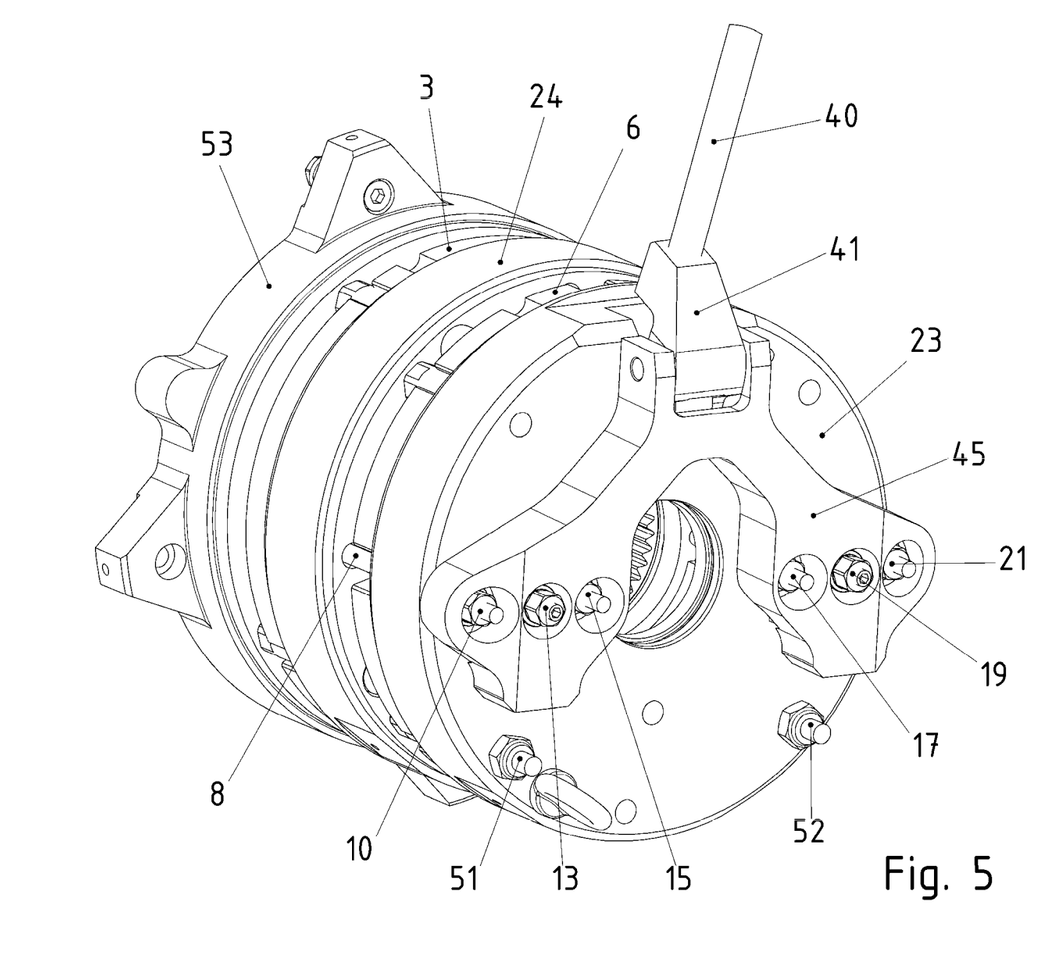
FIG. 5 shows an oblique view of the brake system according to the present invention.

FIG. 5 shows an oblique view of the brake system according to the present invention. Brake lever 9 has an essentially U-shaped first lever section 45, a second lever section 41 angled toward magnet body 23, and an operating element 40.

Essentially U-shaped first lever section 45 has two limb sections and a connecting section. An end area of the first limb section has the bores, through which in each case one of bolts 8, 11, 14 is passed. An end area of the second limb section has the bores, through which in each case one of bolts 16, 20, 22 is passed. These bores are preferably disposed symmetrically relative to each other in the end areas of the limb sections.

Figure 3:
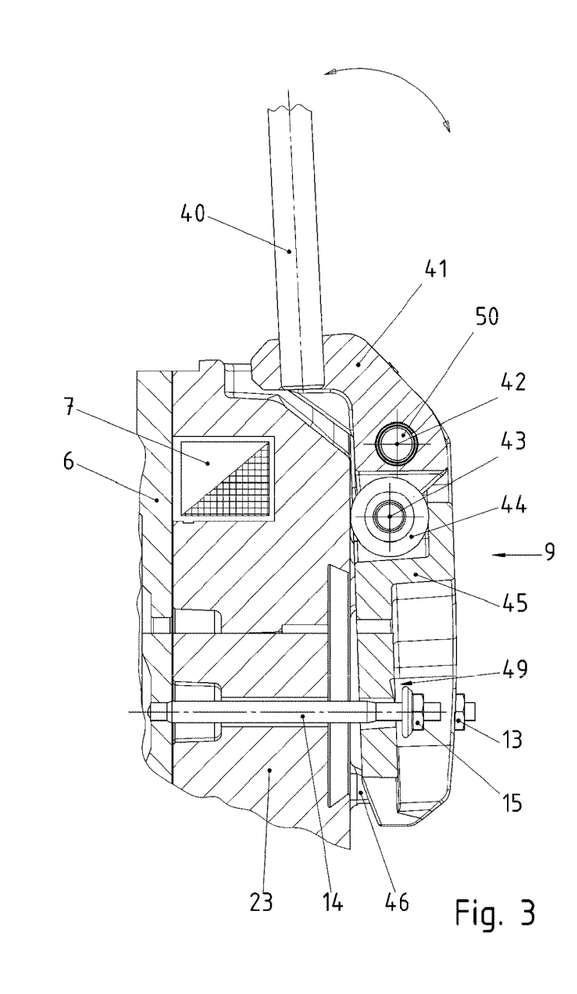
FIG. 3 shows a cut-away portion of the brake system according to the present invention as a sectional view, having a manual release in the closed position.

FIG. 3 shows a detailed lateral view of brake lever 9 with the manual release in the closed position. In the closed position of brake lever 9, a U-shaped base of first lever section 45 is essentially perpendicular to axis of rotation 25 of shaft 1. Consequently, the base of first lever section 45 is parallel to an axial lateral surface of brake 26 facing away in the axial direction from the motor.

The length of bolts 11, 22, 14, 16 joined to armature disks 3, 6 is selected so that in the closed position of the manual release, respective limiting elements 10, 21, 13, 15 are set apart from first lever section 45. Upon opening of the manual release, limiting elements 10, 21, 13, 15 contact first lever section 45. In each case, first lever section 45 has a notch 49 in the area of the contact surface of each limiting element 10, 21, 13, 15. In this context, notch 49 has an angle relative to the base of first lever section 45 which is less than 90°, preferably less than 45°. In particular, the angle between notch 49 and the base is equal to a maximum displacement angle of brake lever 9.

In a first lever position, the contact surface of limiting elements 10, 21, 13, 15 is thus aligned parallel to a bottom side of limiting elements 10, 21, 13, 15. In a second lever position, especially in the case of open manual release, the bottom side of limiting elements 10, 21, 31, 15 is set apart from the contact surface and is rotated by a non-zero angle relative to the contact surface.

In this context, the displacement angle of brake lever 9 is the angle between the base of first lever section 45 and the axial lateral surface of brake 26 facing away from the motor in the axial direction.

First lever section 45 is joined to second lever section 41 with the aid of a pin 50. Pin 50 thereby defines a pin axis 42, so that second lever section 41 is thus disposed in a manner allowing rotation relative to first lever section 45. Pin 50 is situated in the connecting section of first lever section 45. Pin 50 is guided through a first bore in first lever section 45, through a bore in second lever section 41 and through a second bore in first lever section 45.

The connecting section of first lever section 45 thus in turn has two limbs, between which second lever section 41 is disposed, pin 50 being situated between the limbs and second lever section 41. The end areas of pin 50 are preferably riveted to the limbs. Alternatively, first lever section 45 and second lever section 41 are supported on pin 50 by friction bearings, a limiting element (not shown) preventing pin 50 from slipping out of lever sections 41, 45.

Second lever section 41 has two segments, which are disposed at an angle relative to each other and are realized in one piece. The angle between the first and second segments of second lever section 41 is greater than 0°, particularly between 45° and 120°, preferably between 75° and 100°. The first segment of second lever section 41 is joined to first lever section 45 of brake lever 9 with the aid of pin 50.

The second segment of second lever section 41 is joined to operating element 40. To that end, the second segment of second lever section 41 has a bore preferably taking the form of a threaded bore. An end area of operating element 40 has an external thread, so that operating element 40 is able to be screwed into the threaded bore of second lever section 41. Operating element 40 is thus detachably joined to second lever section 41.

Operating element 40 preferably takes the form of a bar, the length of the bar being greater than the axial length of brake 26. Preferably, a recess is provided in a heat sink (not shown) of the motor, the recess being suitable for accommodating operating element 40 released from second lever section 41.

Operating element 40 is preferably at least partially hollow. Consequently, brake lever 9 has a predetermined breaking point in operating element 40, which is easily exchangeable.

A roller 44 is rotationally mounted on second lever section 41. For that purpose, second lever section 41 has two limb sections, between which roller 44 is disposed. A pin is passed through bores in the limb sections and a centered bore in roller 44. Roller 44 is thus supported on second lever section 41 with the aid of the pin.

The roller contacts an axial lateral surface of brake 26. Roller 44 is situated axially between magnet body 23 and first lever section 45. A recess is provided in first lever section 45, the recess at least partially encircling roller 44 in the closed position of brake lever 9.

Brake 26, particularly magnet body 23 of brake 26, thus has a surface section which is suitable as rolling surface for roller 44, roller 44 contacting an area of the rolling surface in linear fashion. During the actuation of brake lever 9, this linear area within the rolling surface shifts.

Roller 44 thus defines a roller axis 43, which runs parallel to pin axis 42. At the same time, pin axis 42 and roller axis 43 are perpendicular to axis of rotation 25 of the motor.

Roller 44 is situated at an end area of the first segment of second lever section 41. As a result, pin axis 42 is situated between roller axis 43 and the second segment of second lever section 41.

In the closed position of the manual release, the axial distance between first lever section 45 and magnet body 23 is very small, particularly less than 1 cm, preferably less than 5 mm.

Figure 4:
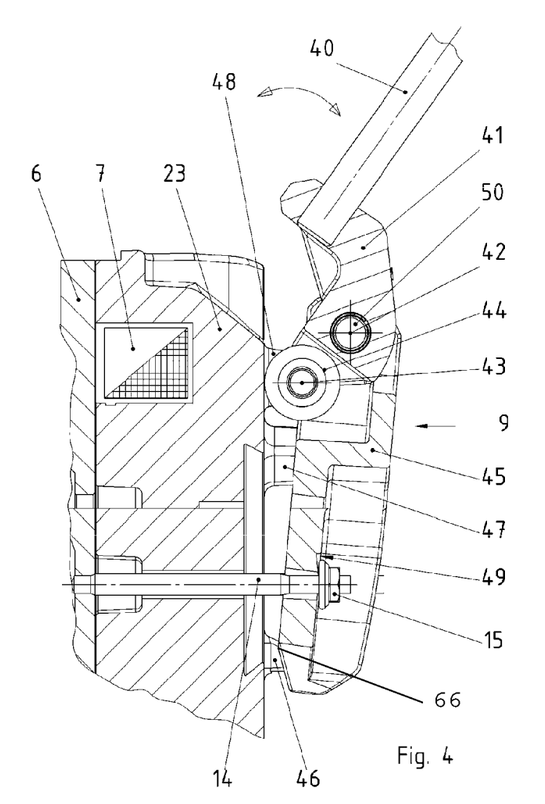
FIG. 4 shows a cut-away portion of the brake system according to the present invention as a sectional view, having a manual release in the open position.

FIG. 4 shows a detailed lateral view of brake lever 9 having manual release in the open position.

The axial lateral surface of brake 26 has at least one support 46, on which an end area of first lever section 45 rests. Support 46 is preferably formed as a protrusion that engages in a depression 66 in first lever section 45. The protrusion is preferably realized in one piece with magnet body 23.

The rolling surface of the brake has at least two limiting means 47, 48, which in particular are realized as projections in one piece with magnet body 23. Limiting means 47, 48 limit movement of roller 44 in the radial direction.

Brake lever 9 thus includes a first and a second lever. The first lever has pin axis 42 as rotation point, with operating element 40 and the second segment of second lever section 41 as power arm, and the first segment of second lever section 41 as load arm. With the aid of roller 44, the lever force is diverted at roller axis 43. The second lever with support 46 as rotation point has a power arm having the first segment of second lever section 41 and first lever section 45, and a load arm having bolts 8, 14, 16, 22.

In a further exemplary embodiment (not shown), instead of operating element 40, a fastening means, e.g., a screw or a threaded pin, is able to be screwed into the threaded bore in second lever section 41, brake lever 9 being securable with the aid of this screw. In this case, the fastening means is screwed through the threaded bore into a further bore in brake 26. Particularly during maintenance work on the brake, manual release of brake 26 is thus made possible, without the user using his hand to hold brake lever 9.

In a further exemplary embodiment (not shown), the brake may be realized with a single pad carrier, a single armature disk and a single electromagnet. In this exemplary embodiment, the brake lever is able to be joined to the armature disk with the aid of at least one bolt.

In another exemplary embodiment (not shown), brake 26 has no housing part 53, but rather, is mounted directly on an end shield of the electric motor. In this case, the end shield accommodates a bearing of shaft 1 of the electric motor. On its surface facing pad carrier 2, the end shield has a braking surface on which the brake pad of pad carrier 2 rubs during braking. In this case, the end shield acts as a heat dissipater for the heat generated during braking.

In a further exemplary embodiment (not shown), instead of roller 44, first lever section 41 has a sliding surface which slides on magnet body 23 of the brake.

What is claimed is:

1. An electromagnetically actuatable brake system, comprising:
    an armature disk;
    a brake lever that includes a first lever section and a second lever section;
    a limiting element;
    a spring element;
    at least one bolt connected by a threaded connection to a magnet body of a brake, wherein:
        the bolt is passed through a continuous, axial first bore in the first lever section,
        the bolt limits a distance of the first lever section to the magnet body with the aid of the limiting element and the spring element disposed between the limiting element and the first lever section,
        the first lever section is situated between the magnet body and the spring element,
        the limiting element has a larger outside diameter than the spring element,
        the spring element has a larger outside diameter than the first bore;
    a further limiting element;
    a further armature disk; and
    at least one further bolt connected by a threaded connection to the further armature disk, wherein:
        the further bolt limits a distance of the further armature disk to a further magnet body of a brake with the aid of the further limiting element,
        the further bolt is connected by a further threaded connection to the further limiting element,
        the further bolt is passed through a continuous, axial third bore in the first lever section,
        the further limiting element is disposed on a side of the first lever section facing away from the further armature disk,
        the further limiting element has a larger outside diameter than the third bore,
        the further bolt is passed through a continuous, axial further through-bore in the magnet body,
        the further magnet body is disposed between the further armature disk and a brake-pad carrier,
        the further bolt is passed through a continuous, axial bore in the further magnet body,
        the further bolt is passed through a continuous, axial bore in the armature disk,
        an outer maximum radius of the brake-pad carrier is smaller than a radial distance between the further bolt and an axis of rotation.

2. The brake system as recited in claim 1, wherein the brake lever is for a manual release of a brake.

3. The brake system as recited in claim 1, wherein at least one of:
    the first lever section and the second lever section are disposed in a manner allowing rotation relative to each other, and
    the first lever section is rotationally mounted on the second lever section.

4. The brake system as recited in claim 1, further comprising:
    a pivot bearing is disposed between the first lever section and the second lever section.

5. The brake system as recited in claim 4, wherein the pivot bearing includes a pin.

6. The brake system as recited in claim 4, wherein the first lever section and the second lever section are supported on the pin by friction bearings.

7. The brake system as recited in claim 4, further comprising:
    a roller rotationally mounted on the second lever section.

8. The brake system as recited in claim 7, wherein the brake includes a surface section that is suitable as a rolling surface for the roller, the roller contacting one area of the rolling surface.

9. The brake system as recited in claim 8, wherein the surface section is of the magnet body of the brake.

10. The brake system as recited in claim 8, wherein the surface section is an axial lateral surface.

11. The brake system as recited in claim 1, wherein the first lever section contacts a surface of the brake, so that a support is formed for the first lever section on the brake.

12. The brake system as recited in claim 11, wherein the surface of the brake is an axial lateral surface of the brake with respect to an axis of rotation of the armature disk.

13. The brake system as recited in claim 12, wherein the axial lateral surface is of the magnet body of the brake.

14. The brake system as recited in claim 12, wherein at least one of:
    the support includes a protrusion formed on the magnet body and engaging with a corresponding depression in the first lever section, and
    the support is realized in one piece with the magnet body.

15. The brake system as recited in claim 9, wherein the rolling surface is limited by at least one limiting arrangement.

16. The brake system as recited in claim 15, wherein the limiting arrangement limits a radial movement of the roller and is formed in one piece on the magnet body.

17. The brake system as recited in claim 1, further comprising at least one additional bolt connected to the armature disk, wherein:

the additional bolt limits a distance of the armature disk to the magnet body of the brake with the aid of the limiting element, the additional bolt is connected to the limiting element, the additional bolt is passed through a continuous second bore in the first lever, the limiting element is disposed on a side of the first lever section facing away from the armature disk, and the limiting element has a larger outside diameter than the first bore.

18. The brake system as recited in claim 17, wherein the additional bolt is connected to the armature disk by a first threaded connection, and wherein the additional bolt is connected to the limiting element by a second threaded connection.

19. The brake system as recited in claim 17, wherein the continuous second bore is an axial bore.

20. The brake system as recited in claim 17, wherein:
the bolt is passed through a continuous, axial through-bore in the magnet body, and
the magnet body is disposed between the armature disk and the first lever section.

21. The brake system as recited in claim 1, further comprising:
at least one spring part;
a coil accommodated in the magnet body of the brake;
a brake-pad carrier disposed so as to be rotatably fixed with the aid of a driver toothing situated on a rotor shaft of an electric motor of the brake system, with form locking in a circumferential direction, and movable axially in an axial direction of the rotor, the brake-pad carrier having a corresponding internal toothing engaged with the driver toothing, wherein:
the armature disk is joined in rotatably fixed manner to the magnet body and disposed in a manner allowing axial movement, the armature disk being guided by at least one guide part in the axial direction of the rotor shaft,
the armature disk is acted upon by the spring part, the spring part being supported on the magnet body,
the guide part is secured to the magnet body, and
the brake-pad carrier is disposed axially between the armature disk and a part having a braking surface.

22. The brake system as recited in claim 1, further comprising:
at least one further spring part;
a further coil accommodated in the further magnet body;
a further brake-pad carrier disposed so as to be rotatably fixed with the aid of a further driver toothing located on a rotor shaft of an electric motor of the brake system, with form locking in a circumferential direction, and movable axially in an axial direction of the rotor, wherein:
the further armature disk is joined in a rotatably fixed manner to the further magnet body and disposed in a manner allowing axial movement,
the further armature disk is guided by at least one further guide part in an axial direction of the rotor shaft,
the further magnet body includes a braking surface,
the further armature disk is acted upon by the further spring part, the further spring part being supported on the further magnet body,
the further guide part is secured to the further magnet body, the further brake-pad carrier is disposed axially between the further armature disk and a further part having a further braking surface, and
the further part is realized as one of a housing part and an end shield.

23. The brake system as recited in claim 1, wherein:
the first lever section has two supports in which the first lever section has a connecting section and two limb sections,
a rolling surface is located in a circumferential direction between the two supports,
the supports are situated at the same axial position,
the rolling surface is at least one of even and flat, a direction of surface normal of the rolling surface being parallel to an axis of rotation, and
each limb section of the first lever section has at least one of a first bore, a second, and a third bore.

24. The brake system as recited in claim 17, wherein:
in a first lever position, a surface section of a bottom side of the limiting element touches a contact surface of the first lever section, so that the contact surface and the surface section are aligned in parallel, and
in a second lever position, the surface section is set apart from the contact surface and is rotated by a non-zero angular value relative to the contact surface, a normal of the surface section having a non-zero angle relative to a normal of the contact surface.

25. The brake system as recited in claim 24, wherein an angle between the normal of the surface section and the normal of the contact surface is between 5° and 45°.

26. The brake system as recited in claim 24, wherein an angle between the normal of the surface section and the normal of the contact surface is equal to a maximum displacement angle of the brake lever.

27. The brake system as recited in claim 24, wherein the brake system is one of released and engaged in the first lever position.

28. The brake system as recited in claim 24, wherein the contact surface includes a notch in a surface of the first lever section.

29. The brake system as recited in claim 1, wherein at least one of:
the brake lever is disposed on a side of a brake facing away axially from an electric motor of the brake system, and
the brake lever has an operating element.

30. The brake system as recited in claim 29, wherein the operating element is releasably joined to the second lever section.

31. The brake system as recited in claim 30, wherein the second lever section includes a threaded bore into which the operating element is able to be screwed into place.

32. The brake system as recited in claim 1, wherein the brake system is for an electric motor having a rotor shaft.

33. An electric motor, comprising:
a brake system that includes:
an armature disk,
a brake lever that includes a first lever section and a second lever section;
a rotor shaft;
a brake-pad carrier joined in a rotatably fixed and axially displaceable manner to the rotor shaft;
a limiting element;
a spring element;
at least one bolt connected by a threaded connection to a magnet body of a brake, wherein:

the bolt is passed through a continuous, axial first bore in the first lever section, the bolt limits a distance of the first lever section to the magnet body with the aid of the limiting element and the spring element disposed between the limiting element and the first lever section, the first lever section is situated between the magnet body and the spring element, the limiting element has a larger outside diameter than the spring element, the spring element has a larger outside diameter than the first bore;

a further limiting element;

a further armature disk; and at least one further bolt connected by a threaded connection to the further armature disk, wherein:

the further bolt limits a distance of the further armature disk to a further magnet body of a brake with the aid of the further limiting element, the further bolt is connected by a further threaded connection to the further limiting element, the further bolt is passed through a continuous, axial third bore in the first lever section, the further limiting element is disposed on a side of the first lever section facing away from the further armature disk, the further limiting element has a larger outside diameter than the third bore, the further bolt is passed through a continuous, axial further through-bore in the magnet body, the further magnet body is disposed between the further armature disk and a brake-pad carrier, the further bolt is passed through a continuous, axial bore in the further magnet body, the further bolt is passed through a continuous, axial bore in the armature disk, an outer maximum radius of the brake-pad carrier is smaller than a radial distance between the further bolt and an axis of rotation.

34. The electric motor as recited in claim 33, wherein the rotor shaft includes two driver toothings set apart axially from each other.

* * * * *